United States Patent [19]

Murata et al.

[11] E Re. 29,895

[45] Reissued Jan. 30, 1979

[54] CONVERGENCE MEANS FOR A PLURAL BEAM COLOR PICTURE TUBE

[75] Inventors: Hiroshi Murata, Yokohama; Akiyoshi Inose, Tokyo; Masahide Sawai, Ebina; Yuzo Fuse, Tokyo, all of Japan

[73] Assignee: Sony Corporation, Tokyo, Japan

[21] Appl. No.: 737,437

[22] Filed: Nov. 1, 1976

Related U.S. Patent Documents

Reissue of:

[64] Patent No.: 3,594,600
Issued: Jul. 20, 1971
Appl. No.: 888,338
Filed: Dec. 29, 1969

[30] Foreign Application Priority Data

Dec. 30, 1968 [JP] Japan ..... 43-96500

[51] Int. Cl.[2] ..... H01J 29/50; H01J 29/76
[52] U.S. Cl. ..... 313/411; 313/412
[58] Field of Search ..... 313/413, 414, 411, 412

[56] References Cited

U.S. PATENT DOCUMENTS

| | | | |
|---|---|---|---|
| 3,462,638 | 8/1969 | Tetsuo et al. | 315/13 |
| 3,571,645 | 3/1971 | Miyaoka | 313/411 |
| 3,575,625 | 4/1971 | Miyaoka | 313/411 |

*Primary Examiner*—Robert Segal
*Attorney, Agent, or Firm*—Lewis H. Eslinger; Alvin Sinderbrand

[57] ABSTRACT

In a color cathode-ray tube of the plural-beam type wherein the beams originate on a horizontal or vertical straight line and are directed into fields produced by a horizontal-vertical electromagnetic deflection yoke at predetermined incident angles to each other so as to converge at a color screen, magnetic shielding means, for example, secured to electron beam convergence plates, are disposed for selectively shielding at least one of the beams from the leakage flux produced by the horizontal-vertical electromagnetic deflection yoke in deflecting the beams in the direction of the line of origination thereof, whereby such leakage flux acts selectively on only the unshielded beam or beams for correcting a deviation between the positions of rasters on the color screen produced by the plural beams.

6 Claims, 7 Drawing Figures

FIG. 1
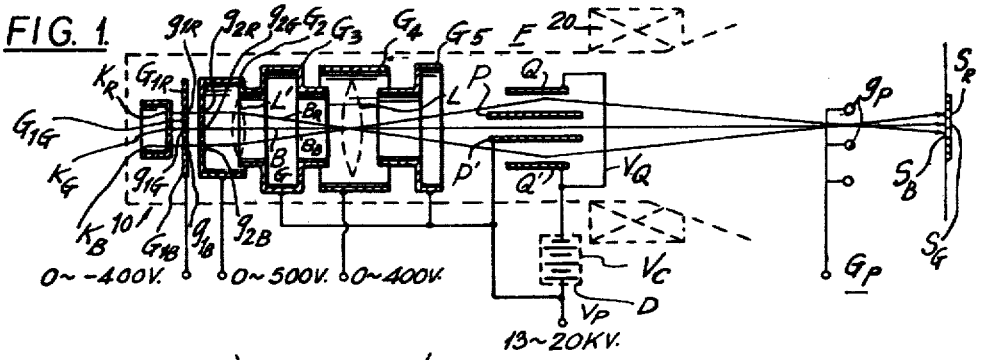
FIG. 2A
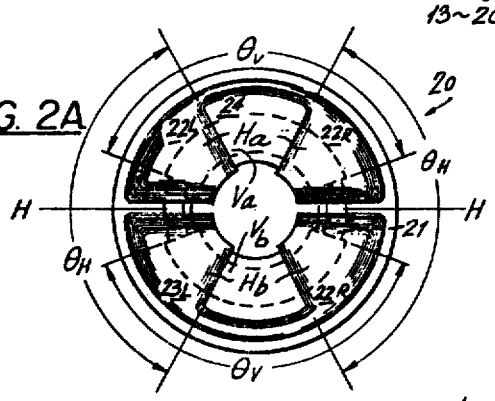
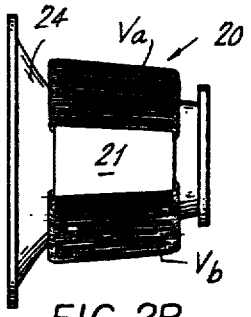
FIG. 2B.
FIG. 3.
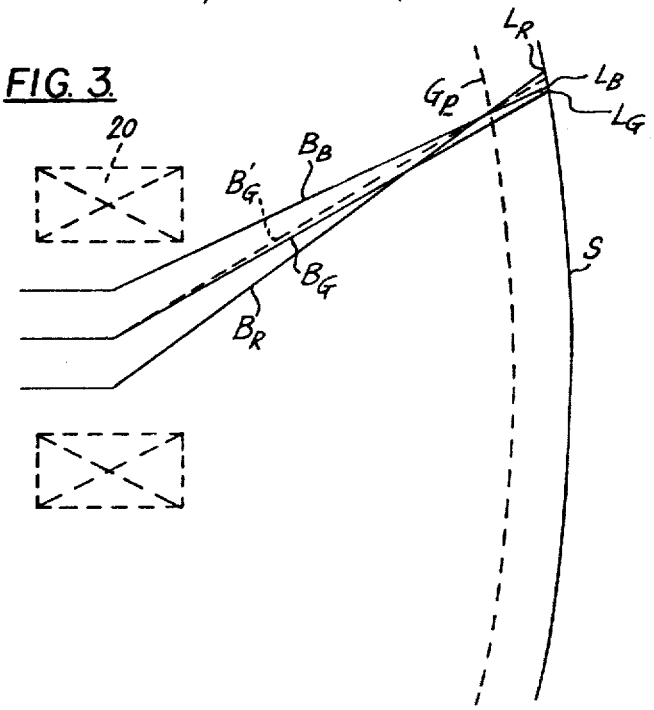

CONVERGENCE MEANS FOR A PLURAL BEAM COLOR PICTURE TUBE

Matter enclosed in heavy brackets [ ] appears in the original patent but forms no part of this reissue specification; matter printed in italics indicates the additions made by reissue.

This invention relates generally to color picture tubes of the plural-beam type, and particularly to tubes of that type in which the plural beams are made to converge at a common point on a beam-selecting grid or mask associated with the color phosphor screen at which the beams are focused.

In single-gun, plural-beam color picture tubes of the described type, for example, as specifically disclosed in U.S. Pat. No. 3,448,316, granted June 3, 1969, and having a common assignee herewith, three laterally spaced electron beams are emitted or originated by a beam-generating or cathode assembly and directed in a common substantially horizontal or vertical plane with the central beam coinciding with the optical axis of the single electron lens and the two outer beams being converged to cross the central beam at the optical center of the lens and thus emerge from the latter along paths that are divergent from the optical axis. Arranged along such divergent paths are pairs of convergence deflecting plates having voltages applied thereacross to deflect the divergent beams substantially in the plane of origination thereof for causing all beams to converge at a point on the apertured beam-selecting grid or shadow mask associated with the color screen. After passing between the convergence deflecting plates, the beams are acted upon by the magnetic fields resulting from the application of horizontal and vertical sweep signals to the corresponding coils of a deflection yoke, whereby the beams are made to scan the screen in the desired raster. It will be apparent that, when the three beams are deflected by the yoke from a point of convergence at the center of the screen, as during scanning, the distances that such beams travel through the magnetic fields of the deflection yoke are relatively varied and spherical aberration results, that is, the beams undergo different degrees of deflection resulting in misconvergence of the beams, particularly when the latter are directed at corner portions of the screen.

Although certain aspects of the above-described misconvergence can be corrected by suitably shaping and dimensioning the horizontal and vertical deflection coils, for example, as hereinafter described in detail, there remains a horizontal deviation of the raster of the central beam with respect to the rasters of the other two beams, particularly at the opposite side portions of the screen in the case of the beams originating in a horizontal plane.

Accordingly, it is an object of this invention to avoid the above-mentioned horizontal deviation of the rasters from each other, particularly at the opposite side portions of the screen of a color picture tube of the described type, without resorting to complex dynamic convergence devices for that purpose.

Another object is to achieve the desired registration of the rasters by shielding one or more of the electron beams from a correction field which is applied to the remainder of the electron beams.

A further object is to achieve registration of the rasters by shielding the side beams from flux leakage from the horizontal deflection magnetic field produced by the deflection yoke, while permitting such leakage flux to act in a space through which one, for example, the central, electron beams passes, whereby to impart an additional horizontal deflection to the central beam as compared with the side beams.

In accordance with an aspect of this invention, a plural-beam color picture tube, as described, is provided with magnetic shielding members disposed at outer sides of the paths of the side beams, preferably at the exit for the latter between the convergence deflecting plates, and each of the shielding members has a straight portion extending at right angles to the plane in which the beams originate and end portions provided on the ends of the straight portion and extending inwardly at substantial angles to the latter to act as magnetic shields so that leakage flux from the deflection yoke coil intended to deflect the beams at right angles to said plane is substantially prevented from acting on the side beams while being free to act on the central beam and thus from the correction field applied to the latter.

The above, and other objects, features and advantages of this invention, will become apparent from the following detailed description of an illustrative embodiment which is to be read in conjunction with the accompanying drawings, in which:

FIG. 1 is a schematic horizontal cross-sectional view showing a plural-beam, single-electron-gun-type color cathode-ray tube of the type to which the present invention can be applied;

FIGS. 2A and 2B are front and side views showing the mechanical arrangement of deflection yoke means applicable to the color cathode-ray tube of FIG. 1;

FIG. 3 is a diagrammatic view illustrating the manner in which the beams are deflected and converged, and showing the deviations thereof from correct convergence to be corrected by this invention;

Figure 4:
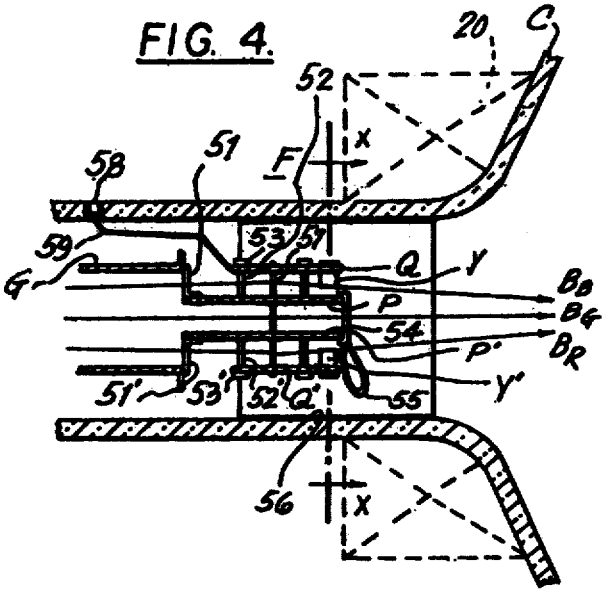
FIG. 4 is a horizontal cross-sectional view of the main portion of the color tube of FIG. 1, but shown with an embodiment of the present invention applied thereto.

In order to provide a better understanding of the present invention, a three-beam single-gun-type color cathode-ray tube of the type disclosed in detail in U.S. Pat. No. 3,448,316, and to which this invention may be applied is generally described below.

Referring to the drawings, and initially to FIG. 1 thereof, it will be seen that the single-gun, plural-beam color picture tube 10 there shown may comprise a glass envelope (shown in dotted lines) having a neck, and a cone extending from the neck to a color screen S provided with the usual arrays of color phosphors $S_R$, $S_G$ and $S_B$, and with an apertured beam-selecting grid or shadow mask $G_P$. Disposed within the neck is a single electron gun having cathodes $K_R$, $K_G$ and $K_B$, each of which is constituted by a beam-generating source with the respective beam-generating surfaces thereof disposed as shown in a plane which is substantially perpendicular to the axis of the electron gun. In the embodiment shown, the beam-generating surfaces are arranged in a straight line so that the respective beam $B_R$, $B_G$ and $B_B$ emitted therefrom are directed in a substantially horizontal plane containing the axis of the gun, with the central beam $B_G$ being coincident with such axis. A first grid $G_1$ is spaced from the beam-generating surfaces of cathodes $k_R$, $K_G$ and $K_B$ and has apertures $g_{1R}$, $g_{1G}$ and $g_{1B}$ formed therein in alignment with the respective cathode beam-generating surfaces. A common grid $G_2$ is spaced from the first grid $G_1$ and has apertures $g_{2R}$, $g_{2G}$ and $g_{2B}$ formed therein in alignment with the respective apertures of the first grid $G_1$. Successively arranged in the axial direction away from the common grid $G_2$ are open-ended, tubular grids or electrodes $G_3$, $G_4$ and $G_5$, respectively, with cathodes $K_R$ $K_G$ and $K_B$, grids $G_1$ and $G_2$, and electrodes $G_3$, $G_4$ and $G_5$ being maintained in the depicted assembled positions thereof, by suitable, nonillustrated support means of an insulating material.

For operation of the electron gun of FIG. 1, appropriate voltages are applied to grids $G_1$ and $G_2$ and to electrodes $G_3$, $G_4$ and $G_5$, and, as a result, an electron lens field will be established between grid $G_2$ and the electrode $G_3$ to form an auxiliary lens L' as indicated in dashed lines, and an electron lens field will be established around the axis of the electrode $G_4$, by the electrodes $G_3$, $G_4$ and $G_5$, to form a main lens L, again as indicated in dashed lines.

Further included in the electron gun of FIG. 1, are electron beam convergence deflecting means F which comprise shielding plates P and P' disposed in the depicted spaced, relationship at opposite sides of the gun axis, and axially extending, deflector plates Q and Q' which are disposed, as shown, in outwardly spaced, opposed relationship in shielding plates P and P', respectively. Although depicted as substantially straight, it is to be understood that the deflector plates Q and Q' may, alternatively, be somewhat curved or outwardly bowed, as is well known in the art.

The shielding plates P and P' are equally charged by a voltage $V_P$ and disposed so that the central electron beam $B_G$ will pass substantially undeflected between the shielding plates P and P', while a voltage $V_Q$ is applied to the deflector plates Q and Q' so that the latter have negative charges with respect to the plates P and P', whereby electron beams $B_B$ and $B_R$ will be convergently deflected as shown by the respective passages thereof between the plates P and Q and the plates P' and Q'.

In operation, the respective electron beams $B_R$, $B_G$ and $B_B$ which emanate from the beam-generating surfaces of cathodes $K_R$, $K_G$ and $K_B$ will pass through the respective apertures of grid $G_1$ to be intensity modulated with what may be termed "red," "green" and "blue" intensity modulation signals applied between the cathodes and the first grid $G_1$. The respective electron beams will then pass through the common auxiliary lens L' to cross each other at the center of the main lens L and emerge from the latter with beams $B_R$ and $B_B$ diverging from beam $B_G$. Thereafter, the central electron beam $B_G$ will pass substantially undeflected between shielding plates P and P' since the latter are at the same potential. When electron beam $B_B$ passes between plates P' and Q' and electron beam $B_R$ passes between plates P and Q, they will converge as a result of the convergence deflecting voltage applied therebetween. The system of FIG. 1 is arranged so that the electron beams $B_B$, $B_G$ and $B_R$ will desirably converge or cross each other at a common spot centered in an aperture between adjacent grid wires $g_P$ of the beam-selecting grid or mask $G_P$ so as to diverge therefrom to strike the respective color phosphors of a corresponding array on screen S.

Thus, to summarize the operation of the depicted color picture tube of FIG. 1, the respective electron beams $B_B$, $B_G$ and $B_R$ are intended to be converged at screen grid $G_P$ and to diverge therefrom in such manner that electron beam $B_B$ will strike the "blue" phosphor $S_B$, electron beam $B_G$ will strike the "green" phosphor $S_G$ and electron beam $B_R$ will strike the "red" phosphor $S_R$ of the array or set corresponding to the grid aperture at which the beams converge.

Electron beam scanning of the face of the color phosphor 1968, is effected in a conventional manner, for example, by horizontal and vertical electromagnetic deflection means 20 indicated in broken lines. Deflection means 20 may be constructed as a deflection yoke having horizontal and vertical deflection coils wound in a saddlelike or toroidal form. By selecting the winding angle and position of the deflection coils so that a pincushion shaped horizontal deflection field is produced by the horizontal deflection coil and a barrel-shaped vertical deflection field is produced by the vertical deflection coil, it is possible to effect dynamic convergence by the magnetic fields produced by the deflection yoke, as described in detail in U.S. Pat. application Ser. No. 753,694, filed Aug. 19, 1968, which is now U.S. Pat. No. 3,500,114, granted Mar. 10, 1970, and having a common assignee herewith.

An example of a deflection yoke means capable of producing a pin-cushion-shaped deflection field, and a barrel-shaped vertical deflection field is shown at 20 in FIGS. 2A and 2B. In FIGS. 2A and 2B, a deflection yoke 21 is provided on a yoke-supporting annular member 24 which is enlarged at its front end in the form of a funnel. A pair of vertical deflection coils $V_a$ and $V_b$ are symmetrically wound in a toroidal form on deflection yoke 21 with respect to horizontal plane H—H passing through the axis of the yoke. These vertical deflection coils are connected, for example, in series with each other. In order to produce a barrel-shaped vertical deflection field, the winding angle $\phi_V$, at which the vertical deflection coils $V_a$ and $V_b$ are wound on the yoke 21, is selected to be greater than that which would produce a rectangular vertical deflection field. In the case of a uniformly distributed winding, the winding angle is set between 120° and 160°.

A pair of saddle-shaped horizontal deflection coils $H_a$ and $H_b$ extend within annular member 24 and are symmetrically located with respect to horizontal plane H—H. These horizontal deflection coils are connected, for example, in series with each other. In order to produce a pin-cushion-shaped field, the left-hand side effective coil portion 22L of horizontal deflection coil $H_a$, and the left-hand side effective coil portion 23L of horizontal deflection coil $H_b$ are disposed in contact, or in closely spaced relationship with each other. Similarly, the right-hand side effective coil portion 22R of coil $H_a$ and the right-hand side effective coil portion 23R of coil $H_b$ are disposed in contact, or closely spaced relationship with each other. The winding angles $\theta_H$ of coil portions 22L and 23L, and of coil portions 22R and 23R are selected to be between 120° and 130°. The front portions of coils $H_a$ and $H_b$ adjacent the wide end of support 24 are constructed in the form of a winding represented by the nth power of the cosine, or $\cos_n$, where n is a positive number between 2 and 7. The rear portions of coils $H_a$ and $H_b$ are constructed in the form of a winding represented by the mth power of the cosine, or $\cos^m$, where m is a positive number between 1 and 3.

With the above arrangement, even if horizontal and vertical convergence voltage and current generating circuits, and vertical convergence means are omitted, dynamic convergence in both the horizontal and vertical directions can be effected with respect to the three beams $B_R$, $B_B$ and $B_G$ when these beams are made to scan screen S.

The three beams $B_R$, $B_G$ and $B_B$, when being deflected horizontally and vertically are located in a common plane which is inclined with respect to the horizontal plane H—H through an angle corresponding substantially to the angle of vertical deflection, as the beams are always arranged on a substantially horizontal line. However, the three beams in the common plane enter into the deflection yoke means 20 at difference incident angles due to convergence means F. Thus, if the deflection yoke means of FIGS. 2A and 2B is not employed, there is a tendency that the three beams will cross each other at a position which is short of the beam-selecting grid or mask when these beams are directed to the left or right-hand side portion thereof. However, by using the deflection yoke means of FIGS. 2A and 2B, beam $B_B$ is deflected from its deflection center position across a field portion of minimum strength corresponding to the position of the deflection center for beam $B_G$ and beam $B_R$ is deflected from its deflection center position through a relatively strong portion of the pin-cushion-type field. Thus, the three beams can be made up to converge accurately with each other at the beam-selecting grid or mask. For vertical deflections, if the deflection yoke means of FIGS. 2A and 2B is not used, the three beams tend to cross each other short of the screen at the opposite sides as in the horizontal deflection. By using the deflection yoke means of FIGS. 2A and 2B, however, the three beams are subjected to substantially the same component of a barrel-type field so as to converge with each other at the grid or mask $G_p$, since they are not vertically spaced apart from each other.

Thus by winding the horizontal deflection coil in a saddlelike form, and by winding the vertical deflection coil in a toroidal form corresponding with the curved surface of screen S, vertical dynamic convergence can be effected without using any vertical dynamic convergence voltage and current generating circuits. The configurations of the pin-cushion and barrel magnetic fields can be determined by winding angle $\Theta_V$ of vertical deflection coils $V_a$ and $V_b$ and their positions on yoke 21, and winding angle $\phi_H$ of horizontal deflection coils $H_a$ and winding angle $\Theta_H$ of horizontal deflection coils $H_a$ effective convergence can be achieved without providing dynamic convergence means as normally required by convention color cathode-ray tubes, or on the other hand, more effective convergence can be obtained by using such dynamic convergence means at the same time.

By winding the horizontal deflection coils in a saddle-like form, it is possible to easily change the configurations of the portion of the horizontal deflection field on the screen side and that on the electron gun side so that, for example, one of the field portions can be of the barrel type, while the other field portion is of the pin-cushion type, while the remainder of the horizontal deflection field is either a pin-cushion-type or a barrel-type field. This would become difficult to achieve if the horizontal deflection coils were wound in toroidal form.

Usually rasters appearing on the screen tend to be subjected to pin-cushion distortion due to the configuration of the screen in spite of setting the focusing adjustment to achieve the best possible beam focusing. However, by affording a pin-cushion shape to the horizontal deflection field portion at the screen side and affording a barrel shape to the horizontal deflection field on the electron gun side, in accordance with the saddle-like configuration of the horizontal deflection coils it is possible to easily correct pin-cushion distortion of the rasters resulting from curvature of the screen.

With the foregoing arrangement, however, the following undesirable effect is produced due to the fact that the horizontal deflection field is of the pin-cushion-type configuration. When the three beams $B_R$, $B_G$ and $B_B$ originating in a common horizontal plane are horizontally deflected to scan screen S at the opposite side portion of the latter, rasters $L_R$, $L_G$ and $L_B$ resulting from the "red," "green," and "blue" beams $B_R$, $B_G$ and $B_B$ should be located at equal distances from each other. However, as shown in full lines on FIG. 3, beams $B_R$, $B_G$ and $B_B$, when deflected horizontally to one or the other of the side portions of screen S, do not land on the latter at equally spaced locations with the landing spot of beam $B_G$ being midway between the landing spots of beams $B_R$ and $B_G$. The foregoing tendency results from the fact that, with the horizontal deflection field having a pin-cushion-type configuration to compensate for spherical aberration as described above, the side beam that originates at the side of the central beam $B_G$ in the direction of horizontal deflection, for example, the side beam $B_B$ as shown on FIG. 3, passes for a relatively short distance through a strong portion of the horizontal deflection field, whereas the other side beam $B_R$ passes for a large distance through a weak portion of the horizontal deflection field. Thus, the beams $B_B$ and $B_R$ are deflected through angles sufficient to cause their convergence at a common point on the beam-selecting grid or mask $G_P$. However, the central beam $B_G$, which also passes through a relatively weak portion of the horizontal deflection field, travels through such portion of the field for a distance that is shorter than the path of beam $B_R$ in the horizontal deflection field and, as a result thereof, the deflection of beam $B_G$ is less than that required to cause proper convergence of the latter beam with beams $B_B$ and $B_R$. In other words, when side beams $B_B$ and $B_R$ properly converge at a common point on one or the other of the side portions of grid or mask $G_P$, the central beam $B_G$ arrives at the grid or mask at a point that is displaced inwardly from that common point, as shown in full lines on FIG. 3.

In accordance with this invention, the above undesirable effect or deviation is corrected by shielding the side beams $B_B$ and $B_R$ from a leakage flux produced by the horizontal deflection field of yoke 20, while permitting such leakage flux to act fully on central beam $B_G$ so that the latter will be horizontally deflected by a greater angle to crossbeams $B_R$ and $B_B$ at the common point of convergence of the latter at grid or mask $G_P$, as indicated in broken lines at $B'_G$ on FIG. 3. When the invention is applied to a color cathode-ray tube of the type shown on FIG. 1, the shielding of side beams $B_R$ and $B_B$ from the leakage flux from the horizontal deflection field may be advantageously effective at the exit of such beams from the convergence deflecting means F.

Figure 5:
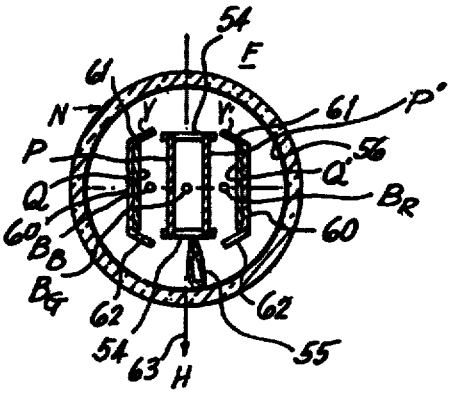
FIG. 5 is a transverse sectional view taken along line X—X of the tube of FIG. 4.

More specifically, as shown on FIGS. 4 and 5 such convergence deflecting means F may have its electrode plates P and P' attached to the end surface of cylindrical grid $G_5$ through conductive angle members 51 and 51' respectively. Electrode plates Q and Q' are attached to insulating members 53 and 53' mounted on support pins 52 and 52' extending from the electrode plates P and P' respectively. Further, a brush or coil spring member 55 is secured to a bracing member 54 bridging the free ends of electrode plates P and P' so as to maintain a spacing between these electrode plates. Member 55 is in electrical contact with a conductive layer 56 extending over the inner surface of the neck portion N, and to which an anode voltage $V_P$ is applied by way of an anode button (not shown). Hence, such anode voltage is applied to electrode plates P and P'. Plates Q and Q' are connected with each other through a conductor wire 57, and a conductor wire 59 extends from electrode plate Q for example to a button 58 provided in the neck portion N for example, so that a voltage that is 200 to 300 volts lower than anode voltage $V_P$ can be thereby applied to electrode plates Q and Q'.

In accordance with this invention, magnetic shielding members Y and Y' are mounted on the outer surfaces of electrode plates Q and Q', respectively, adjacent the ends of the latter remote from electrode $G_5$. Each of these magnetic shielding members Y and Y' may include a flat or straight portion 60 (FIG. 5) extending across the corresponding electrode plate Q or Q', and bent end portions 61 and 62 which extend inwardly from the opposite ends of straight portion 60.

Figure 6:
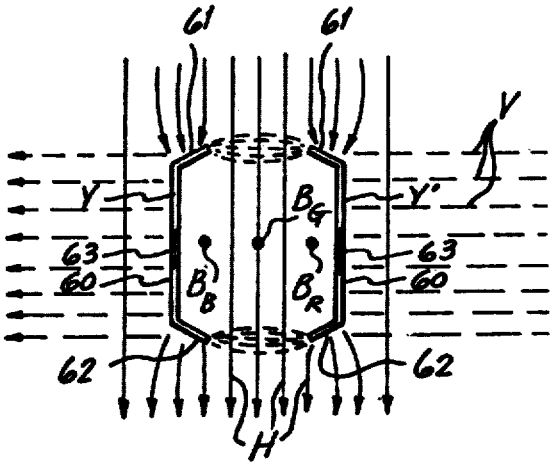
FIG. 6 is a diagrammatic view showing the magnetic field distribution occurring in the embodiment of the invention illustrated by FIGS. 4 and 5.

With such an arrangement, magnetic leakage flux from the horizontal deflection field produced by deflection yoke means 20 and extending over the lateral regions between the plate P and Q and plates P' and Q' can pass through the opposing magnetic shielding members Y and Y', as indicated by the arrows 63 on FIG. 6. It is obvious that because of the described configuration of magnetic shielding member Y and Y', the horizontal field distribution density in the portion of the space therebetween through which center beam $B_G$ passes is higher than the horizontal field distribution densities in the portions of such space through which side beams $B_R$ and $B_B$ pass, as shown in FIG. 6. If it is assumed that the horizontal deflection magnetic leakage flux enters magnetic shielding member Y at its end portion 61, it will be apparent that the leakage flux occurring over the lateral extent of such end portion 61 will be collected thereby and the magnetic flux thus collected will arrive at end portion 62 of shielding member Y, and then be expanded. Similarly, the horizontal deflection magnetic leakage flux enters shielding member Y' at its end portion 61 which collects the leakage flux over its lateral extent, and the flux thus collected travels through straight portion 60 to arrive at end portion 62 of shielding member Y' and then be expanded. On the other hand, the horizontal deflection leakage flux located laterally between the end portions 61 and the end portions 62 of shielding members Y and Y' are substantially uninhibited by the latter and thus act on center beam $B_G$ to relatively increase the horizontal deflection of the latter and thus restore the center beam to the position shown at $B'_G$ on FIG. 3.

Since shielding members Y and Y' are located at the exit end of convergence deflecting means F, that is, close to the horizontal-vertical deflection yoke 20, it will be apparent that the leakage flux from the horizontal deflection field of yoke 20 which is allowed to act only on the center beam $B_G$ will then be of relatively high density to provide a sufficiently large corrective or additional deflection to center beam $B_G$ for correcting the deviation shown on FIG. 3. On the other hand, if shielding members Y and Y' were disposed at the entry end of convergence deflection means F, that is, adjacent to electrode $G_5$, the leakage flux of the horizontal deflection field would there be of insufficient density to provide the requisite additional deflection to center beam $B_G$ when allowed to act on that beam while being excluded from acting on side beams $B_R$ and $B_B$.

It will be apparent that the shielding members Y and Y', being disposed outwardly with respect to the paths of side beams $B_R$ and $B_B$, will also collect the leakage flux, indicated in broken lines at V on FIG. 6, from the vertical deflection field of yoke 20, whereby the density of the vertical deflection leakage flux will tend to be greater between the inwardly directed ends 61 and the inwardly directed ends 62 of shielding members Y and Y', and a reduced density of vertical deflection leakage flux is present between straight portions 60 of the shielding members. However, since all three beams $B_R$, $B_G$ and $B_B$ are located between straight portions 60, the vertical deflection leakage flux existing between the latter will not have any substantial differential effect with respect to the vertical deflection of the beams. This is to be distinguished from the arrangement disclosed in copending U.S. application Ser. No. 796,838, filed Feb. 5, 1969, which is now U.S. Pat. 3,548,249, granted Dec. 15, 1970, and having a common assignee herewith, and in which magnetic yoke members are mounted on the plates P and P' at the entry to convergence deflection means F so as to respectively extend between center beam $B_G$ and side beam $B_R$ and between the center beam and the other side beam $B_B$. Such magnetic yoke members have bent end portions which extend outwardly therefrom and which serve to collect the leakage flux from the vertical deflection field of yoke 20 so that the leakage flux of the vertical deflection field occurring outside one of the magnetic yoke members is collected thereby and passes, with a relatively high density, to the other magnetic yoke member from which the flux again expands. The result of the foregoing is that the concentration of the leakage flux between the yoke members, that is, in the space through which the central beam passes provides a differential vertical deflection of the central beam with respect to the side beams so as to avoid a vertical deviation of the center beam from the point of convergence of the side beams when such beams are vertically deflected toward the top or bottom of the screen. Although the described yoke members do provide the side beams with some shielding from the leakage flux of the horizontal deflection field, such leakage flux is too small at the entry to the convergence deflection means F to provide the relatively large additional deflection or correction required for correcting the deviation of the center beam shown on FIG. 3 hereof. Further, if the yoke members of U.S. application Ser. No. 796,838 were located at the exit end of convergence deflecting means F, whereby to provide a significant additional horizontal deflection or correction to the center beam, the increased density of the leakage flux from the vertical deflection field at such location would result in an excessive vertical deflection or correction being imparted to the center beam. Thus, in correcting for both vertical and horizontal deviations, it is desirable to provide the yoke members of U.S. application Ser. No. 796,838 at the entry to convergence deflecting means F and the shielding members Y and Y′ of this application at the exit from the convergence deflecting means.

The above-described horizontal corrective effect can be produced merely by providing the magnetic shielding members Y and Y′ at the exit from convergence means F. Furthermore, the magnetic correcting field needed for assisting the horizontal deflection of the center beam is then obtained from the leakage component of the horizontal deflection field produced by deflection yoke means 20. Therefore, there is no need to provide any special electromagnetic means to produce the deflection correcting field.

[Although the leakage component of the horizontal deflection field is used for aiding the horizontal deflection of the center beam in the described embodiment, it will be apparent that it is also possible to produce the aforementioned effect by providing additional, external electromagnet means or permanent magnet means to produce magnetic flux acting on the center beam and from which the side beams are shielded by member Y and Y′.]

In the above description of the invention, it has been assumed that the shielding members Y and Y′ according thereto are employed to correct a deviation of the raster of center beam $B_G$ from the rasters of side beams $B_R$ and $B_B$ that may remain even when the horizontal and vertical deflection coils are given the configuration described with reference to FIGS. 2A and 2B. However, it will be appreciated that, when the horizontal and vertical deflection coils are not given the configuration of FIGS. 2A and 2B, the shielding members Y and Y′ can be still employed to correct the aforementioned deviation between the rasters of the three electron beams.

In the described embodiment of the invention, the three beams originate in a horizontal plane. However, these three beams may originate in a vertical plane, in which case the horizontal deflection coils should be wound in a saddlelike form to produce a barrel-shaped horizontal deflection field, and the vertical deflection coils should be wound in a toroidal form to produce a pin-cushion-shaped field. Furthermore, in such a case, the direction in which the phosphor stripes of the screen and the grid wires of the grid extend should be changed to the horizontal direction, and the convergence deflecting means F is turned through 90° to effect convergence of side beams $B_B$ and $B_R$ vertically toward center beam $B_G$.

[Further, the application of the present invention is not limited to tubes in which the plural beams originate on a straight horizontal or vertical line. Thus, the invention is also applicable to tubes in which the origins of the three beams are in a delta arrangement, and the three beams are intended to converge at a common point on the beam-selecting grid or mask adjacent the color screen. In this case too, the present invention can be employed to increase the horizontal deflection of the center beam relative to the deflections of the side beams.]

Having described a particular embodiment of the invention with reference to the accompanying drawings, it will be understood that the invention is not limited to such precise embodiment, and that various changes and modifications, only some of which have been mentioned above, may be made therein without departing from the scope or spirit of the invention.

What we claim is:

1. In a color cathode-ray tube having means generating plural beams *including a central beam and opposite side beams which originate in a common horizontal plane and* which are directed, at predetermined incident angles to each other for convergence on a screen, through horizontal and vertical deflection fields produced by electromagnetic deflection means and by which said beams are made to scan said screen, the improvement comprising magnetic shielding means disposed *in advance of said electromagnetic deflection means* adjacent the paths of said beams through said deflection fields and being operative to [selectively] *equally* shield [at least one of] said *opposite side* beams from leakage flux from said horizontal deflection field while permitting said leakage flux to act on [another of said beams] *said central beam* for correcting deviations between the rasters of said plural beams on said screen.

[2. A color cathode-ray tube according to claim 1, in which said plural beams originate in a common plane and include a central beam and opposite side beams, and in which said magnetic shielding means are positioned to permit only said central beam to be acted upon by said leakage flux while shielding said side beams therefrom.]

3. A color cathode-ray tube according to claim [2] *1*, in which said magnetic shielding means includes two spaced-apart shielding members disposed at outer sides of the paths of said side beams and being shaped to collect and to direct around said side beams the leakage flux that would otherwise act on said side beams.

4. A color cathode-ray tube according to claim 3, in which each of said shielding members includes a substantially straight portion extending substantially parallel to and in spaced relation to the straight portion of the other shielding member, and end portions at the ends of said straight portion and being directed at substantial angles to the latter in the direction toward the corresponding end portions of the other of said shielding members.

5. A color cathode-ray tube according to claim 4, in which [said common plane is horizontal and] said straight portions of the yoke members extend substantially vertically so that said shielding members collect and direct around said side beams the leakage flux from the horizontal deflection field in the lateral regions through which said side beams pass.

6. In a single-gun, plural-beam color picture tube which includes a color screen having arrays of color phosphors and beam-selecting means provided with apertures corresponding to said arrays, beam-generating means for directing a central electron beam and two side electron beams in a common plane toward said screen for impingement on respective phosphors of each array through the corresponding aperture, lens means for focusing said electron beams on said screen and having an optical center at which said beams are made to cross each other with said side beams emerging from said lens means along paths lying in said plane and which are divergent with respect to the central beam, electron beam convergence deflecting means operative, upon the application of a convergence deflecting voltage thereto, to deflect said side beams emerging along said divergent paths for convergence of all of said beams at an aperture of said beam-selecting means, and deflection yoke means having sweep signals applied thereto to provide fields which deflect said beams in directions respectively parallel and at right angles to said plane for causing said beams to scan said screen; the improvement comprising magnetic shielding means disposed *in advance of said deflection yoke means* adjacent the exit from said convergence deflecting means and shielding only said side beams from leakage flux from said field which deflects said beams in said direction parallel to said plane while permitting said leakage flux to pass unimpeded in a zone through which said central beam passes for correcting deviations in the direction of said plane between the positions of the rasters on the color screen produced by said beams in scanning said screen.

7. A single-gun, plural-beam color picture tube according to claim 6, in which said magnetic shielding means includes spaced-apart shielding members arranged at the outer sides of said side beams and each having a substantially straight portion at right angles to said plane and end portions at the ends of said straight portion and being directed inwardly at substantial angles to the latter.

* * * * *